United States Patent [19]

Gaines

[11] 3,836,403

[45] Sept. 17, 1974

[54] LITHIUM BATTERIES AND METHOD OF PREPARING A POSITIVE ELECTRODE MATERIAL THEREFOR

[75] Inventor: Lewis H. Gaines, Framingham, Mass.

[73] Assignee: Tyco Laboratories, Inc., Waltham, Mass.

[22] Filed: Apr. 1, 1971

[21] Appl. No.: 130,277

[52] U.S. Cl. .......................... 136/83 R, 136/100 R
[51] Int. Cl. ........................................ H01m 17/02
[58] Field of Search ........... 136/83, 6, 20, 153, 154, 136/111, 100, 24, 28, 29, 137, 175, 120

[56] References Cited
UNITED STATES PATENTS

| 3,043,896 | 7/1962 | Herbert et al. | 136/6 |
| 3,248,265 | 4/1966 | Herbert | 136/6 |
| 3,279,952 | 10/1966 | Minnick | 136/100 |

Primary Examiner—Anthony Skapars
Attorney, Agent, or Firm—Schiller & Pandiscio

[57] ABSTRACT

Method of providing an improved positive electrode material for lithium batteries comprising heating $Ni_3S_2$ in air or oxygen at a temperature and for a period of time such as to produce an oxidation product that exhibits a discharge behavior substantially better than that of $Ni_3S_2$ when ionically coupled to lithium by a non-aqueous electrolyte.

14 Claims, 3 Drawing Figures

PATENTED SEP 17 1974　　3,836,403

LEWIS H. GAINES
INVENTOR.
BY
Schiller & Pandiscio
ATTORNEYS.

LITHIUM BATTERIES AND METHOD OF PREPARING A POSITIVE ELECTRODE MATERIAL THEREFOR

This invention relates to lithium batteries and more particularly to an improvement in cells of the type comprising lithium anodes and nickel sulfide cathodes in non-aqueous electrolytes.

A variety of batteries employing lithium electrodes are known, as exemplified by U.S. Pat. Nos. 2,902,530, 3,030,400, 3,043,896, 3,248,265, 3,279,952, 3,380,855, 3,393,092, 3,393,093, 3,415,687, 3,243,242, 3,466,197, and 3,508,966. It also is known, as demonstrated by U.S. Pat. No. 3,248,265, to make lithium batteries having cathodes of nickel sulfide. It also has been determined that improved operating characteristics may be obtained by fabricating the cathode of $Ni_3S_2$.

The primary object of this invention is to provide a further improvement in batteries of the type having an anode comprising lithium and a cathode comprising $Ni_3S_2$ in a non-aqueous electrolyte comprising an aprotic organic solvent.

Cell performance in a battery of the type described is limited by the discharge capability of the relatively heavy $Ni_3S_2$ electrode. I have now recognized that the discharge behavior of $Ni_3S_2$ positive electrodes can be improved by modifying the method of fabricating such electrodes. Accordingly a further object is to provide an improved method of treating $Ni_3S_2$ positives which results in improved electrode performance.

Briefly, the invention consists of heating the $Ni_3S_2$ electrode material in air or oxygen at a suitable temperature for a period of time sufficient to modify its discharge behavior in a cell. The heating may be conducted before or after the cathode is fabricated but before the electrode is contacted with the electrolyte. Other objects, features and advantages of the invention are set forth in or rendered obvious to persons skilled in the art by the following detailed specification which is to be considered together with the accompanying drawing wherein.

Figure 1:
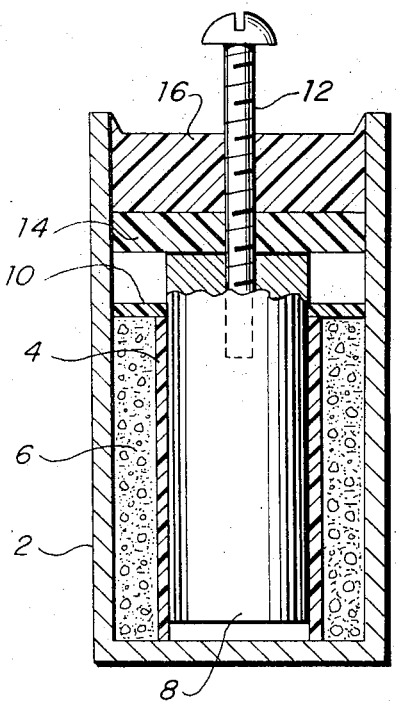
FIG. 1 shows a LeClanche-type cell that may be made according to the present invention.

Various types of lithium batteries, e.g., a LeClanche-type cell or a button type cell, may be made with $Ni_3S_2$ positive material treated according to the present invention. By way of example, FIG. 1 shows a LeClanche-type cell which comprises a cylindrical aluminum can 2 that serves as both the cell container and the positive terminal. The can also may be made of some other conductive material that is not corroded by the electrodes or electrolyte; e.g., a nickel-plated steel. Mounted within the cell is a cylindrical separator sleeve 4 made of an ionically permeable electronically insulating material that allows ionic conduction between the negative and positive plate materials while physically separating the two so as to prevent direct electronic conduction. The separator preferably is made of coarsely woven glass fiber sleeving. A substitute material for the separator is a plastic fabric such as polypropylene mat having small pores or openings therein just large enough to make it permeable to ions but not large enough to permit through flow of positive plate material. Other materials known to be capable of serving as ion permeable membranes also may be used. The space between the separator sleeve 4 and the side wall of can 2 is filled with a paste 6 made up of the positive material and the electrolyte, the positive material comprising $Ni_3S_2$ and the electrolyte comprising an ionizable salt such as lithium perchlorate or potassium hexafluorophosphate in an aprotic organic solvent such as propylene carbonate. The positive material may also include a binder. The binder may be a conductive material, such as nickel or aluminum or carbon in particulate form. However, it is not essential that the binder be conductive since $Ni_3S_2$ is an electronic conductor. Tetrahydrofuran also may be added to the paste for low temperature operation. Other electrolyte compositions as described in U.S. Pat. Nos. 3,248,265, 3,043,896, and 3,423,242 may also be used. The negative electrode, i.e., the anode, is in the form of a rod 8 which is disposed within the separator 4 in direct contact therewith. The negative electrode preferably is lithium metal. However, it may also be an amalgam or alloy of lithium with some other material; e.g., an alloy of lithium with zinc, silver, or magnesium as suggested in U.S. Pat. Nos. 3,248,265, 3,415,687, and 3,043,896. A retaining washer 10 made of a suitable electrically insulating material, such as Teflon or other inert substance, is slipped over the lithium rod 8 in engagement with the end of separator 4. The washer 10 makes a snug friction fit so as to retain paste 6. The upper end of the rod 8 is fitted with a conductive pin 12 that projects from the can 2 and serves as the negative terminal of the battery. By way of example, pin 12 may be made of nickel plated steel or stainless steel. A second washer 14 made of a suitable insulating material, such as Teflon or other inert substance, is mounted within the can 2 over the pin 12 up against the outer end of the negative electrode. Sealing of the cell is accomplished by applying a suitable insulating potting compound as shown at 16 over the washer 14. Various conventional potting compounds may be used, such as a flexible polysulfide/epoxy adhesive or a rigid alumina-filled adhesive cement.

Figure 2:
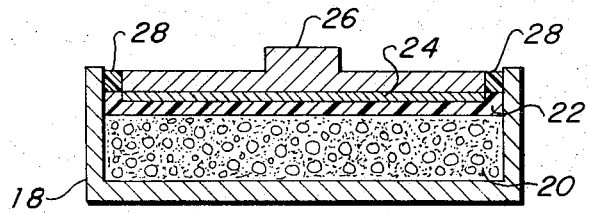
FIG. 2 shows a button-type cell that may be made according to the present invention.

Further by way of example, FIG. 2 illustrates a button type cell which may be made in accordance with the invention. The cell comprises a thin-walled shallow metal case 18 made of a conductive metal such as aluminum so as to serve as the positive terminal. The case is partially filled with a composition 20 comprising positive plate material soaked with electrolyte. The positive plate material comprises $Ni_3S_2$ (and may include a binder of the nature described formed as a dry mixture with the $Ni_3S_2$) and is pressed into the case. The electrolyte (having a composition as described above) is added to the positive material after the latter has been pressed into the case. The layer of positive material is porous and hence absorbs the electrolyte. Also disposed in the case is a cup-shaped member 22 adapted to function as a cell separator and electrolyte retainer. The member 22 is made of an insulating material that permits ionic but not electronic conduction between the positive and negative plate materials. Preferably, it is made of a nonwoven polypropylene mat. Disposed on top of and in contact with the member 22 is an electrode 24 which may be made of lithium or a lithium alloy as the rod 8. Preferably electrode 24 is made from lithium foil. A contact member 26 made of a conductive material that is not corroded readily by lithium is placed on top of the lithium electrode and secured in place by a suitable potting compound 28. Preferably, the contact member is made of magnesium metal. However, it also may be made of other noncorrosive material such as brass, nickel plated steel, or stainless steel. The contact member serves as the negative terminal of the cell.

The $Ni_3S_2$ material used in galvanic cells, e.g., the cells of FIGS. 1 and 2, may be made by reduction of anhydrous $NiSO_4$ through reaction with hydrogen. Preferably this is accomplished by placing a quantity of $NiSO_4 \cdot 6 H_2O$ in a quartz tube and disposing the tube in tube furnace. The tube is continuously purged by passing nitrogen gas through it while the temperature is raised slowly to about 550°C. The temperature of the $NiSO_4$ is held steady at about 550°C for about ten hours to assured that all of its water of hydration is removed. Then the now anhydrous $NiSO_4$ is cooled to about 325°C, at which point flow of nitrogen gas is terminated and followed by flow of hydrogen gas. At 325°C the hydrogen reacts with the $NiSO_4$ in the solid phase to produce $Ni_3S_2$ according to the following reaction:

$$3NiSO_4 + 10H_2 \rightarrow Ni_3S_2 + SO_2 + 10H_2O$$

It has been found that this reaction should be carried out between about 300° and 350°C and preferably at 325°C. Above about 350°C the reduction reaction will result in nickel metal, while below about 300°C the reaction is very slow. At 325°C, the conversion of $NiSO_4$ to $Ni_3S_2$ is substantially completed in about 50 hours. Accordingly after about 50 hours, the flow of hydrogen is stopped and replaced by a flow of carbon dioxide which is continued as the furnace is cooled. Since freshly prepared $Ni_3S_2$ is a pyrophor, it is cooled slowly to room temperature (and preferably to below 0°C) under a high percentage of $CO_2$ in order to passivate its surface. Once its surface has been passivated, the $Ni_3S_2$ will not flash ignite when exposed to air. It is also possible to passivate the $Ni_3S_2$ by cooling it under a blanket of an inert gas like argon, helium, etc., instead of carbon dioxide. It also is possible to prepare $Ni_3S_2$ by reacting nickel with $CS_2$ or S, but such reactions are more difficult to carry out and hence are not preferred. It is to be noted also that the reduction of $NiSO_4$ to $Ni_3S_2$ should be substantially complete since the presence of any substantial amount of unreduced $NiSO_4$ will materially alter the discharge potential of the positive plate material. It has been found that after about 50 hours of heating at 325°C, all but 1–2% of the $NiSO_4$ has been reduced and such amount has an insignificant effect on the discharge performance of $Ni_3S_2$ reaction product. Of course, the amount of unreacted $NiSO_4$ can be reduced further by extending the reduction reaction beyond 50 hours.

Heretofore the practice has been to use the prepared $Ni_3S_2$ without any further treatment to make cells of the type described. In such cells, at low current rates (e.g., at a rate of about 0.01 ma/cm²) $Ni_3S_2$ positives prepared as above described will tend to discharge at a potential of about 1.45 volts versus $Li/Li^+$. However, if the $Ni_3S_2$ (or the positive plate composition where such composition includes a mixture of $Ni_3S_2$ with a binder or other material, or the cathode where it comprises $Ni_3S_2$ or a mixture thereof with a binder or other material disposed on a supporting substrate) is heated in air or oxygen as hereinafter described before it is contacted with electrolyte, the $Ni_3S_2$ will be oxidized and the oxidation product will have a greater coulombic capacity and will discharge at a substantially higher potential versus $Li/Li^+$ than the untreated $Ni_3S_2$. In the case of a cell like that of FIG. 2, the positive plate material may be oxidized before or after it is pressed into the battery case.

In accordance with this invention the $Ni_3S_2$ is oxidized by heating it in air or oxygen at a temperature of between about 300° and 350°C for a time sufficient to produce an oxidation product (hereinafter termed "oxidized $Ni_3S_2$") that has a coulombic capacity and a discharge potential substantially higher than $Ni_3S_2$ when ionically coupled to lithium by a suitable non-aqueous electrolyte. $Ni_3S_2$ freshly prepared by reduction of $NiSO_4$ as above described has a black color with a yellow sheen. When subjected to oxidation it loses its yellow sheen and becomes a denser black. Accordingly as a practical guide, oxidation is continued at least long enough for the $Ni_3S_2$ to undergo the aforesaid change in color. At temperatures of about 300° to about 350°C the oxidation necessary to produce the desired improvement in coulombic capacity and discharge potential may occur within a period as short as 10–15 minutes; on the other hand the required oxidation may take as much as 4–5 hours and may even be extended further, e.g., 24–36 hours. Preferably the oxidation is conducted in air at a temperature of about 325°C for about 15 minutes. Surprisingly, when $Ni_3S_2$ is heated in air at temperatures of 300°–350°C for periods as long as 4 days, it is not converted to nickel oxide or nickel sulfate; nor does the product lose its electrical conductivity. The exact composition of the oxidized product is not known, but x-ray diffraction studies indicate the presence of multiple phases, one of which is $Ni_3S_2$ and none of which correspond to NiO or $NiSO_4$. On the other hand, the oxidation product discharges at a voltage which is higher than that of pure $Ni_3S_2$ but substantially lower than that of $NiSO_4$. It is to be noted also that oxidation may be accomplished at temperatures below about 300°C but this procedure is avoided since the oxidation rate decreases rapidly with decreasing temperature. At room temperature some surface oxidation will occur but only after a relatively long period, i.e., a period of several months.

The invention is best understood by the following example which is provided for purpose of illustration and is not intended to limit the invention.

EXAMPLE

A positive electrode was prepared by pressing a mixture comprising 95 wt. % $Ni_3S_2$ and 5 wt. % aluminum fibers onto an expanded aluminum grid of circular configuration having a diameter of about 1.75 inches. The aluminum fibers measured approximately 0.005 inch × 0.005 inch in cross-section and had lengths ranging from about 0.125 inch to 0.25 inch. The $Ni_3S_2$ had been freshly prepared by reduction of anhydrous $NiSO_4$ with hydrogen at a temperature of 325°C according to the procedure described above. However, the $Ni_3S_2$ was not oxidized according to the invention. The mixture of $Ni_3S_2$ and aluminum fibers totalled about 3.25 grams and was pressed onto the aluminum grid under a pressure of about 6.5 tons per square inch. The pressed mixture had a total area of approximately 30 square cm. A separator in the form of a non-woven, porous polypropylene mat having a thickness of about 0.009 inch was saturated with an electrolyte consisting of a 1 M solution of lithium perchlorate in propylene carbonate. Also provided was a negative electrode consisting of lithium metal pressed onto both sides of an expanded nickel grid. The negative electrode had a diameter of about 2.0 inches and contained more than enough lithium to fully discharge the positive electrode. The positive and negative electrodes and the separator were placed in a polyethylene bag with the separator disposed between the electrodes. The bag was then clamped between two plates so as to minimize the spacing between the electrodes.

A second cell was prepared in the same manner except that after the mixture of $Ni_3S_2$ and aluminum fibers was pressed onto the aluminum grid, the positive electrode was heated in air at a temperature of 325°C for about 15 minutes. Thereafter the positive electrode was cooled to room temperature and used to form the second cell.

Figure 3:
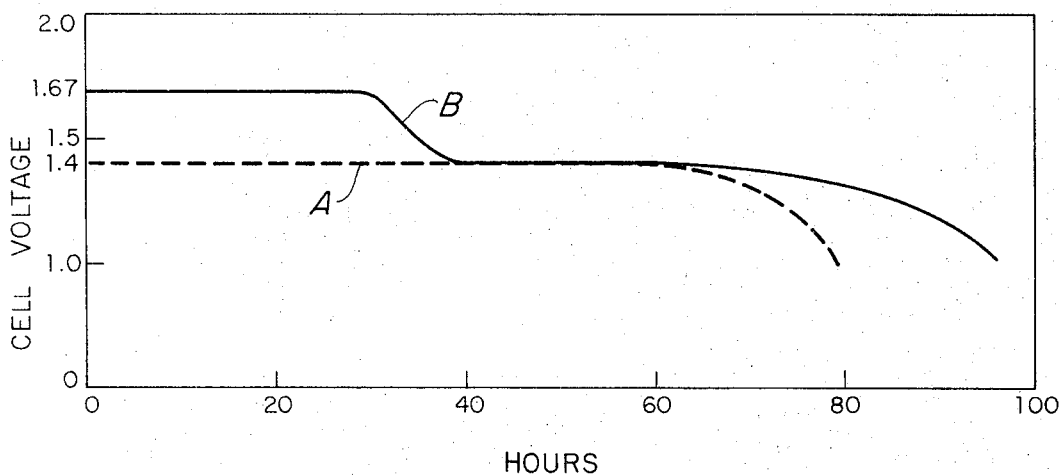
FIG. 3 shows changes in cell voltages of two like cells, only one of which is made in accordance with this invention.

Individual terminal leads were connected to the electrodes of the two cells and each cell was discharged at room temperature (about 75°F) at a constant current of about 0.5 ma/cm$^2$ by coupling the cell in series with a 30 volt constant dc voltage supply and a large ballast resistor. The voltages of the two cells were monitored continuously over a period of about 100 hours. FIG. 3 illustrates the changes in cell voltage with time for the two cells. Curve A pertains to the cell having the non-oxidized nickel sulfide electrode and curve B pertains to the cell having the oxidized electrode. It is to be noted that the non-oxidized electrode discharged at a potential of about 1.4 volts versus Li/Li$^+$ until about 60 hours had elapsed; thereafter its discharge potential dropped rapidly and reached a value of about 1 volt versus Li/Li$^+$ after a total of 80 hours. In contrast, the oxidized electrode discharged along a high potential plateau (about 1.67 volts versus Li/Li$^+$) for approximately 30 hours, after which its potential dropped to about 1.4 volts where it remained for about 70 hours before commencing to drop again. Its discharge potential reached 1.0 volts after about 98 hours. Assuming for purposes of comparison that the useful battery capacity has been exhausted when the cell voltage has dropped to about 1.0 volts, the high potential plateau of curve B amounts to about 35 percent of the useful battery capacity. Additionally the cell with the oxidized $Ni_3S_2$ positive has a coulombic capacity equal to about 104 percent (assuming an equivalent weight of 60) of the theoretical coulombic capacity (about 1.40 ampere-hours) available with the same weight amount of pure $Ni_3S_2$. In contrast the other cell with the unoxidized positive electrode has a coulombic capacity equal to 85 percent of the coulombic capacity theoretically available with the same weight amount of pure $Ni_3S_2$. The dual effects of the high potential plateau and increased coulombic capacity both serve to improve positive electrode and cell performance.

It is to be noted that the initial cell voltage and the level of the high voltage plateau characteristic of the oxidized $Ni_3S_2$ positive depend on the drain rate of the cell. Thus a cell prepared according to this example with an oxidized $Ni_3S_2$ positive will have an initial high voltage plateau at a level of about 1.90 volts if discharged at a constant current rate of 0.015 ma/cm$^2$. A further advantage of the invention is that the oxidized positives exhibit predictable or consistent behavior in terms of improved electrode performance. Thus the useful battery capacity in terms of ampere hours is much the same at drain rates of 0.25 and 0.50 ma/cm$^2$.

It also has been determined that the amount of time elapsing between completion of oxidation and fabrication of the positive electrode is not critical. The same is true of the time elapsing before the oxidized positive material is contacted with electrolyte. However, care must be taken to prevent moisture pickup since moisture has an adverse effect on cell life. In this connection it is to be noted that the step of oxidizing the nickel sulfide also serves to dry it.

As noted above, the oxidizing step is carried out before the positive plate material is contacted with electrolyte and the positive plate may be a paste as in a LeClanche type cell, a pressed layer as in the button type cell of FIG. 2, or a self-supporting electrode in which the oxidized positive is supported on a substrate as in the above example. In the latter case, various conductive materials may be used as the supporting substrate. Thus the substrate may be a solid member or a grid. By way of example, the substrate may be aluminum (as in the foregoing example), nickel plated steel, nickel, or like material. The negative lithium electrode may be in the form of a foil or may comprise lithium or a lithium-alloy plates on a supporting substrate made of a suitable material such as nickel. Still other cell and electrode arrangements known to persons skilled in the art may be used in the practice of this invention.

What is claimed is:

1. A galvanic cell having an anode comprising lithium, a non-aqueous electrolyte, and a cathode comprising the product obtained by heating $Ni_3S_2$ in the presence of an oxidant at a temperature of between about 300°C and about 350°C for a period of at least ten minutes so that said product has a discharge potential with respect to Li/Li$^+$ that is greater than the discharge potential of untreated $Ni_3S_2$ and has a greater coulombic discharge capacity than untreated $Ni_3S_2$.

2. A galvanic cell according to claim 1 wherein said product is obtained by heating $Ni_3S_2$ in the presence of oxygen.

3. A galvanic cell according to claim 2 wherein said product is obtained by heating $Ni_3S_2$ in the presence of air.

4. A galvanic cell according to claim 1 wherein said cathode comprises a mixture of said product and a conductive binder.

5. A galvanic cell according to claim 4 wherein said cathode comprises said mixture on a conductive substrate.

6. Method of preparing a positive plate material for use in a galvanic cell having a negative electrode that comprises lithium, said method comprising heating $Ni_3S_2$ in the presence of an oxidant at a temperature of between about 300°C and about 350°C for a period of at least ten minutes so as to produce a reaction product that has a discharge potential that is greater than untreated $Ni_3S_2$ with respect to Li/Li$^+$ and has a greater coulombic capacity than untreated $Ni_3S_2$.

7. Method of claim 6 wherein said oxidant is oxygen.

8. Method of claim 6 wherein said oxidant is air.

9. Method of treating $Ni_3S_2$ for use as positive electrode material in a lithium battery comprising heating $Ni_3S_2$ in the presence of molecular oxygen at a temperature of between about 300°C and about 350°C for a period of time sufficient to produce an oxidation product that as compared to untreated $Ni_3S_2$ has a greater coulombic discharge capacity and has a greater discharge potential with respect to $Li/Li^+$.

10. Method of preparing a positive electrode material for use in a galvanic cell in which the negative electrode material comprises lithium, said method comprising the steps of subjecting anhydrous $NiSO_4$ to heating at a temperature between about 300°C and about 350°C in the presence of hydrogen for a period of time sufficient to convert substantially all of said $NiSO_4$ to $Ni_3S_2$, cooling said $Ni_3S_2$ in the presence of an inert gas so that said $Ni_3S_2$ is rendered resistant to combustive oxidation when exposed to air, and thereafter heating said $Ni_3S_2$ in the presence of an oxidant at a temperature of between about 300°C and about 350°C and for at least ten minutes so that its coulombic capacity and its discharge potential when ionically coupled to lithium by a non-aqueous electrolyte is greater than that of untreated $Ni_3S_2$.

11. Method of claim 10 wherein said oxidant is molecular oxygen.

12. In the method of manufacturing a galvanic cell by (a) providing a negative plate comprising lithium, (b) providing a positive plate material formed from $Ni_3S_2$, (c) providing a non-aqueous electrolyte comprising an ionizeable salt in an aprotic organic solvent, and (d) contacting said negative plate and said positive plate material with said electrolyte, the improvement comprising subjecting said $Ni_3S_2$ before said positive plate material is contacted with said electrolyte to heating in the presence of molecular oxygen at a temperature of between about 300°C and about 350°C for at least 10–15 minutes so as to increase the coulombic capacity and also the discharge potential of said $Ni_3S_2$ in said cell.

13. The invention of claim 12 wherein said positive plate material is a mixture that includes a binder, and further wherein the step of subjecting said $Ni_3S_2$ to heating in the presence of oxygen is conducted in the presence of said binder.

14. The invention of claim 12 wherein said positive plate material is a mixture that includes a binder, and further wherein the step of subjecting said $Ni_3S_2$ to heating in the presence of oxygen is conducted in the absence of said binder.

* * * * *